United States Patent
Xu et al.

(10) Patent No.: US 11,144,954 B1
(45) Date of Patent: Oct. 12, 2021

(54) PHYSICAL STORE VISIT ATTRIBUTION

(71) Applicant: Facebook, Inc., Menlo Park, CA (US)

(72) Inventors: Liang Xu, Bellevue, WA (US);
Chaochao Cai, Bellevue, WA (US);
Qing Li, Medina, WA (US); Goran Predovic, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 593 days.

(21) Appl. No.: 15/880,078

(22) Filed: Jan. 25, 2018

(51) Int. Cl.
*G06Q 30/02* (2012.01)
*G07C 9/00* (2020.01)
*H04L 29/08* (2006.01)

(52) U.S. Cl.
CPC ..... *G06Q 30/0252* (2013.01); *G06Q 30/0201* (2013.01); *G07C 9/00* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2011/0035280 A1* | 2/2011 | Fordyce, III | G06Q 30/02 705/14.53 |
| 2014/0207567 A1* | 7/2014 | Gould | G06Q 30/0246 705/14.45 |
| 2015/0278867 A1* | 10/2015 | Lerman | G06Q 30/0261 705/14.58 |
| 2015/0356597 A1* | 12/2015 | Saxena | G06Q 30/0246 705/14.45 |
| 2016/0019603 A1* | 1/2016 | Reynolds | G06Q 30/0277 705/14.73 |
| 2016/0027055 A1* | 1/2016 | Dixon | G06Q 30/0261 705/14.58 |
| 2016/0034948 A1* | 2/2016 | Zhong | G06Q 30/0246 705/14.45 |
| 2017/0011418 A1* | 1/2017 | Denton | G06Q 30/0277 |
| 2017/0046734 A1* | 2/2017 | Chittilappilly | G06Q 30/0246 |
| 2019/0080367 A1* | 3/2019 | Agarwal | G06Q 30/0261 |

OTHER PUBLICATIONS

NPL—Yahoo Inc Investor Da y—Transcript of Interview with CEO Carol Bartz (Year: 2010).*

* cited by examiner

*Primary Examiner* — Michael J Sittner
(74) *Attorney, Agent, or Firm* — Fenwick & West LLP

(57) ABSTRACT

An online system promotes physical store visits by presenting users with content items for a physical store location and subsequently logs visits of online system users to the physical store location to track performance of a campaign associated with the presented content item. The online system registers attention events associated with the presented content items presented to users on third party publishing sites via tracking pixels and registers attention events as store front visit conversion events if, within a predetermined period of time from a valid attention event, a user has subsequently gone in and visited the physical store front location.

17 Claims, 3 Drawing Sheets

PHYSICAL STORE VISIT ATTRIBUTION

BACKGROUND

This disclosure relates generally to online systems, and more specifically to presenting content to users of an online system.

Online systems, such as social networking systems, allow users to connect to and to communicate with other users of the online system. Users may create profiles on an online system that are tied to their identities and include information about the users, such as interests and demographic information. The users may be individuals or entities, such as corporations or charities. Online systems allow users to easily communicate and share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting other online system users with certain types of sponsored content provided by the user. Frequently, online systems charge a user for each presentation of sponsored content to an online system user or for each interaction with sponsored content by an online system user. For example, an online system receives compensation from a user each time a content item provided by the user is displayed to another user on the online system, each time another user interacts with a content item from the user presented by the online system (e.g., selects a link included in the content item), or each time another user performs another action after being presented with the content item (e.g., visits a physical location associated with the user who provided the content item to the online system).

Content items may be associated with targeting criteria that identify characteristics of online system users eligible to be presented with the content item. For example, a content item is eligible to be presented to an online system user having characteristics satisfying at least a threshold amount of targeting criteria associated with the content item; however, the content item is not eligible to be presented to another online system user having characteristics satisfying less than the threshold amount of targeting criteria associated with the content item. Targeting criteria associated with a content item are often specified by a user providing the content item to an online system, and allow an online system to identify users who are most likely to be interested in being presented with a particular content item as eligible to be presented with the content item.

With over 90% of retail sales still happening in stores with users increasingly researching products, services, and business locations on their mobile phones, some content items may be more relevant to some users than to other users based on physical locations associated with the users. To identify users, targeting criteria associated with content items may identify a threshold distance from a physical location associated with the content items, so a content item is eligible for presentation to users associated with locations within a threshold distance of a physical location associated with the content item. For example, a content item associated with a restaurant includes targeting criteria specifying a threshold distance from the physical location of the restaurant for a current location of an online system user or for another location associated with the online system user. While many of these content items associated with location targeting criteria are designed to drive people in-store by being more relevant and actionable in the physical world, there are currently no adequate means of determining the effectiveness of advertising campaigns associated with these content items as there are for online purchases.

SUMMARY

For advertising campaigns promoting physical store visits as conversions, an online system determines attribution for ads presented to viewing users on a third party webpages. The online system receives tracking pixel data from the third party webpages when users view or click on the displayed ads and matches the user information associated with the tracking pixel data to users of the online system. The online system registers these user views or clicks as attention events associated with the presented content items. Each attention event corresponds to a user viewing the presented content item or otherwise demonstrating some interest in the presented content item. Accordingly, the online system subsequently monitors the user's location to determine whether they visit the physical store front location associated with the ad and registers the attention event as a store front visit conversion event if, within a predetermined period of time (e.g., 1 or 2 weeks) from the attention event, the user subsequently goes in and physically visits the physical store front location, as determined using location information from a mobile device of the user. With relatively long attribution windows (i.e., the predetermined period of time from the attention event) and with user location tracking raising privacy issues, this is different from online ad campaigns where the mechanism for tracking a conversion is straightforward and direct for a particular objective. Thus, for attribution, a user visiting a store after having a content item presented to them is considered a valid conversion for that content item if the store visit occurs after the predetermined period of time of viewing the content item. Relative to traditional online advertising, the attribution time window is longer since the user must physically visit the store rather than simply clicking on the ad. Further, estimations are made to determine attribution for cross-device users who, for example, view the ad on a first device (e.g., a desktop) and then visit the store with a second device (e.g., a smartphone) and in instances when a user is experiencing poor location services.

Further, in order to maintain user privacy, the online system does not store location history for users (unless permission is given). Moreover, the user store visit data is anonymized by generalizing each user into a user bucket based one or more dimensions of user demographic information (e.g., age range, gender, city) from their user profile and other information, such as which store was associated with the attention event, a timestamp for when the store visit occurred, a timestamp for when the ad impression occurred, and so forth. Further, the timestamp of each store visit can be stored at a reduced resolution (e.g. rounded to the hour) to ensure anonymity of the user's privacy.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
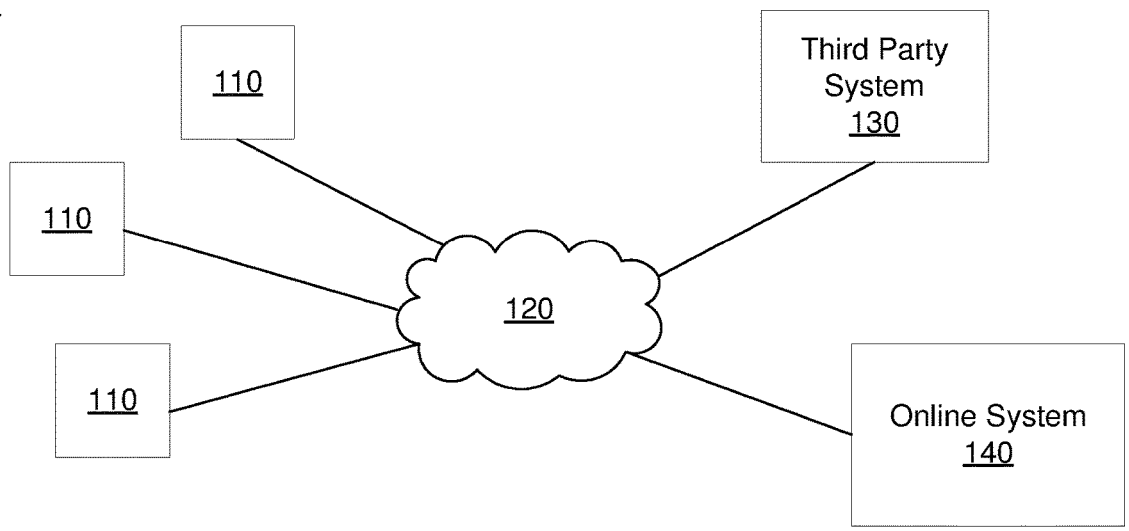
FIG. 1 is a block diagram of a system environment in which an online system operates, in accordance with an embodiment of the invention.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130.

Figure 2:
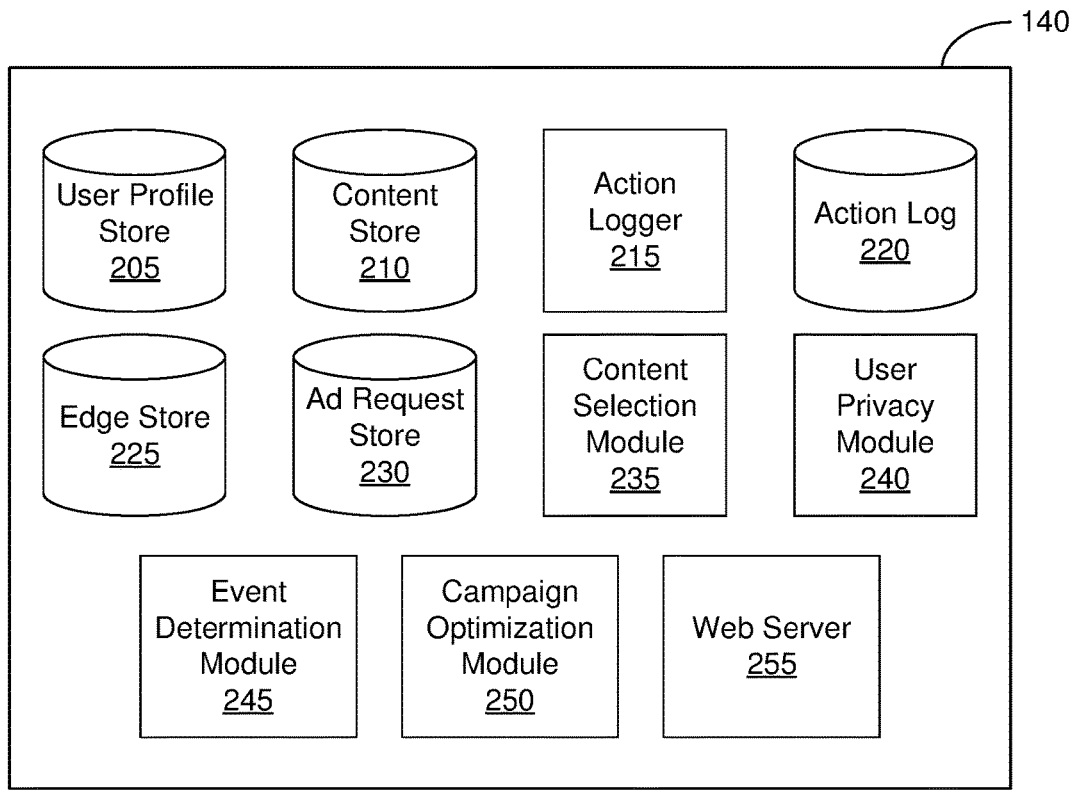
FIG. 2 is a block diagram of an online system, in accordance with an embodiment of the invention.

FIG. 2 is an example block diagram of an architecture of the online system 140. The online system 140 shown in FIG. 2 includes a user profile store 205, a content store 210, an action logger 215, an action log 220, an edge store 225, an ad request store 230, a content selection module 235, a user privacy module 240, an event determination module 245, a campaign optimization module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of a online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

The action log 220 includes information describing interactions with content by online system users as well as conversions associated with online system users. A conversion is an action performed by a user that is desired by an advertiser and may be attributed to one or more interactions of the user that are specified by an advertiser to be monitored or tracked. In one embodiment, the action log 220 includes various databases storing information associated with interactions and conversions. Example types of information associated with an interaction or a conversion stored in the action log 220 include: a description of a type of interaction (e.g., an impression of an advertisement, access of an advertisement or a link, a search performed by a user, a prior conversion associated with the user) and a time associated with the interaction or the conversion (e.g., a timestamp). Additionally, the action log associates user identifying information with each interaction or conversion to identify the user that performed the interaction or the conversion. Multiple types of information identifying a user may be associated with an interaction or a conversion. Example types of user identifying information include an online system user identifier, a client device identifier, an application identifier, and any other suitable information.

The action log 220 additionally receives interactions that are stored as attention events. An attention event corresponds to a user demonstrating some form of interest in content being presented to them. For example, a user interested in a product or service may stare or review an advertisement for the product or service longer relative to an advertisement for a product or service for which they were not interested. Additionally, the user may select the advertisement to obtain additional information. Accordingly, interest in a content item can be demonstrated by a user's gaze lingering on the content item for more than a threshold period of time, the user selecting the content item to receive additional information (e.g., to obtain directions to a store front via the content item), and so forth, among other actions performable by a user.

The action log 220, in one embodiment, uses a tracking pixel or piece of HTML code placed on third-party websites (e.g., a website provided by third party system 130) to log attention events, in one embodiment. A tracking pixel might be included on various pages, including on a product page describing a product, on a shopping cart page that the user visits upon adding an item or product into a shopping cart, on a checkout page that the user visits to checkout and purchase a product, etc. A tracking pixel might also be included on an advertisement or content item to track whether a user showed interest in the advertisement or content item by clicking on or selecting the advertisement or content displayed on a website. For example, a tracking pixel results in a transparent 1×1 image, an iframe, or other suitable object being created for third party pages. When a user's browser loads a page, advertisement, or other content item having a tracking pixel, the tracking pixel results in the user's browser attempting to retrieve content for that pixel. As a result, the browser sends online system 140 a signal comprising a request for the retrieval of the content for that pixel. This signal sent to the online system 140 includes data corresponding to the user's actions taken on the third party website as well as data corresponding to the user's identity. The third party website can control what data is sent to the online system 140. For example, information may be included about a page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data.

In some embodiments, a cookie set by the online system 140 can be retrieved by the online system 140. The cookie, in this instance, includes data identifying the user, such as the online systems' UID for the user, information about the client device or browser of the user, such as the Internet Protocol (IP) address of the client device, among other data. Tracking can also be performed on mobile applications of content providers by using a software development kit (SDK) of the online system 140 or via an application programming interface (API) of the online system 140 to track events (e.g., purchases) that occur by users on the content provider's application that are reported to the online system 140.

The online system 140 can then use this data received about the user to serve better content to the user in the future (e.g., since the online system has further data about products purchased or browsed that might be of interest), to retarget products that the user previously viewed to the user (e.g., where the user went to the product page on a third party site by clicking on content from the third party system 130 presented to the user in the online system 140), and to determine conversion attribution. For example, the online system 140 can use this data in conversion tracking and reporting results of advertising campaigns to the third party system 130. For example, if the third party system 130 has paid the online system 140 to serve content (e.g., content item for products being offered for sale by the third party system 130), and a particular user views content on the online system 140 or on third party system 130 and then purchases a product described in the content (possibly at some point later, and possibly on a different device) either online or at a physical store front location, the online system 140 can link the purchase/conversion to the content originally shown to the user by the online system 140 or by the third party system 130, as described further below.

The action log 220 additionally stores store front visit events. A store front visit event corresponds to a client device of a user being identified at a physical store front location associated with a content item of an advertising campaign. This includes obtaining an actual location of a user (GPS, Bluetooth beacon signal, WiFi signal, etc.). Accordingly, in order to maintain user privacy, the online system does not store location history for users (unless permission is given) and the user store visit data is anonymized by generalizing each user into a user bucket based one or more dimensions of user demographic information (e.g., age range, gender, city) from their user profile and other information, such as which store was associated with the attention event, a timestamp for when the store visit occurred, a timestamp for when the ad impression occurred, and so forth to maintain user privacy by eliminating the possibility of being able to reverse engineer a user's identity. The user attention events, in one embodiment, can also be bucketed into a user bucket. Segmenting users into user buckets based on user demographic information is discussed further below with respect to user privacy module 240.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement ("ad") requests are included in the ad request store 230. An ad request is received from an advertiser for presentation to users of the online system 140 and the ad request may be included in an advertisement campaign ("ad campaign") by the advertiser. Each ad request includes an advertisement, which is content presented to an online system user. Ad content may be text data, image data, audio data, video data, or any other suitable data. Additionally, an advertisement may include a link or destination address associated with a source of content associated with the ad request that is presented to the user if the user accesses the ad content when it is presented. For example, the destination address identifies a landing page including content that is presented to the user when the user accesses the advertisement.

Additionally, an ad request includes a bid amount specifying an amount of compensation a user (e.g., an advertiser) associated with the ad request provides the online system 140 for presenting the advertisement included in the ad request, for a user interacting with the presented advertisement included in the ad request, or for another suitable interaction with a presented advertisement from the ad request by a user. Based on the bid amount included in an ad request, the online system 140 determines an expected value for presenting the advertisement included in the ad request to a user. For example, the expected value is an amount of monetary compensation received by the online system 140 from an advertiser for presenting the advertisement to a user, for a user interacting with the presented advertisement, or based on any other suitable condition. In one embodiment, the expected value of an ad request is a product of the bid amount and a probability of the advertisement of the ad request being accessed by the user if presented.

Additionally, ad requests may be associated with one or more targeting criteria. An advertiser may specify targeting criteria associated with an ad request or may specify targeting criteria associated with multiple ad requests included in an ad campaign. Targeting criteria specify one or more characteristics of users eligible to be presented with an ad content included in an ad request associated with the targeting criteria. Associating different targeting criteria with different ad requests allows an advertiser to tailor presentation of ad content to users having specific characteristics, allowing ad requests including different advertisements to be presented to users with different characteristics. For example targeting criteria specify demographic information, connections, or actions associated with a user. In some embodiments, targeting criteria may be associated with an ad campaign including multiple ad requests, so multiple ad requests in the ad campaign are associated with the targeting criteria.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with advertisements from various ad requests. As another example, targeting criteria identifies users having a connection to another user or object or having a particular type of connection to another user or object.

Additional information may be associated with an ad request. For example, the ad request or ad campaign includes a budget that specifies a total amount of compensation an advertiser provides the online system 140 for presenting an advertisement included in the ad request or included in ad requests associated with an ad campaign. The budget may be allocated for the ad campaign as a whole or per ad request. If the ad request is a content unit identifying a set of advertisements, instructions for allocating the budget among various advertisements of the set of advertisements. The instructions may identify one or more criteria for allocating the budget for presentation of different advertisements of the set of advertisements identified by the ad request. For example, the instructions specify modification of a bid amount for an advertisement of the set identified by the ad request based on a number of times the advertisement has been presented to users of the online system 140 within a time interval or based on a number of one or more particular interactions with the advertisement within a time interval. The instructions may also include other suitable information describing allocation of a budget among advertisements of a set identified by an ad request that is a content unit.

In some embodiments, an ad request included in the ad request store 230 is a content unit identifying a set of advertisements, with each advertisement associated with a physical location. For example, an advertiser may maintain a parent object that represents a brand entity and multiple child objects that each represent different storefront locations of the brand. To create an advertisement that is targeted to users based on location proximity to any one of the storefront locations, the advertiser may create a single ad creative with placeholder content and links that depends on a particular storefront location that is selected for each impression of the ad. To select a storefront location (i.e., child object) for a particular impression of the ad, the system identifies the location to which the user is closest. This class of advertisements are known as dynamic location advertisements and are further described in U.S. patent application Ser. No. 15/089,457, filed on Apr. 2, 2016, which is hereby incorporated by reference in its entirety.

The content selection module 235 selects one or more content items for communication to a client device 110 to be presented to a user. In various embodiments, the content selection module 235 determines a measure of relevance of various content items to the user based on characteristics associated with the user by the online system 140 based on the user's affinity for different content items and selects content items for presentation to the user based on the determined measures of relevance. For example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad content. When selecting ad content, the content selection module 235 uses bid amounts associated with various ad requests. In various embodiments, the content selection module 235 determines an expected value associated with various ad requests and selects ad requests associated with a maximum expected value or at least a threshold expected value for presentation. An expected value associated with an ad request represents an expected amount of compensation to the online system 140 for presenting ad content from the ad request. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 may rank both content items and ad requests in a unified ranking based on bid amounts associated with ad request and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

The user privacy module 240 anonymizes users based on their demographic information maintained by the online system 140 in user profile store 205. In particular, user privacy module 240 maintains user segments which are a highest cardinality combination of available user information. For example, the demographic information used to segment users into buckets includes a different range of values for a single demographic, such as age, a combination of age ranges and gender, a combination of age range, gender, and city, and so forth. Within a "user bucket" all events (impressions, attentions, store visits, etc.) are equal. Thus, each attention events is stored to a user bucket for the user performed the attention event based on their demographic information. Additionally, store front visit events are also stored in the corresponding user buckets. In one embodiment, a user ID associated with each user who has performed an attention event and/or a store front visit event is irreversibly hashed by a daily rotating salt before being logged and is never present in plain or reconstructable form in any store visit event or attention event log.

The event determination module 245 determines a number of store front visit conversion events for the campaign. Each store front visit conversion event, in one embodiment, corresponds to a user of the viewing set of users performing an attention event and subsequently being identified at the physical store front location associated with the campaign within the predetermined period of time. The result of anonymizing the store front visit events and attention events is that the content item impression (that received an attention event) corresponds to a store front visit event is not explicitly knowable, but is rather inferable. Thus, the online system 140 cannot explicitly know whether a particular user who performed an attention event at timestamp t1 is the same user who visited the store front location at t2. Rather, event determination module 245 can, in one embodiment, determine that x number of users in a user bucket B1 visited the store front within a predetermined time period of x number of B1 user bucket users performing an attention event on the content item associated with the physical store front location. In one embodiment, the x number of B1 user bucket users is an estimate for the actual number of store front visit conversion events for the users in user bucket B1 because a coincidental user with demographic information matching the demographic information for user bucket B1 could coincidently walk into a store front without having been presented a content item associated with the store front and after (but within the predetermined period of time) another B1 bucket user performed an attention event.

The campaign optimization module 250 identifies user buckets associated with the most frequent number store front visit conversion events (e.g., greater than a threshold number) to identify user segments that are more likely to response to this form of advertising. Accordingly, campaign optimization module 250, with the limited information available within the user buckets, trains a model to identify users that are most likely to visit a store front after viewing a content item describing a product or service available for purchase at the store front location. Alternatively, campaign optimization module 250 may adjust targeting criteria for the campaign to provide content items to users falling within the identified user buckets.

The web server 255 links the online system 140 via the network 120 to the one or more client devices 110, as well as to the one or more third party systems 130. The web server 140 serves web pages, as well as other web-related content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or RIM®.

Figure 3:
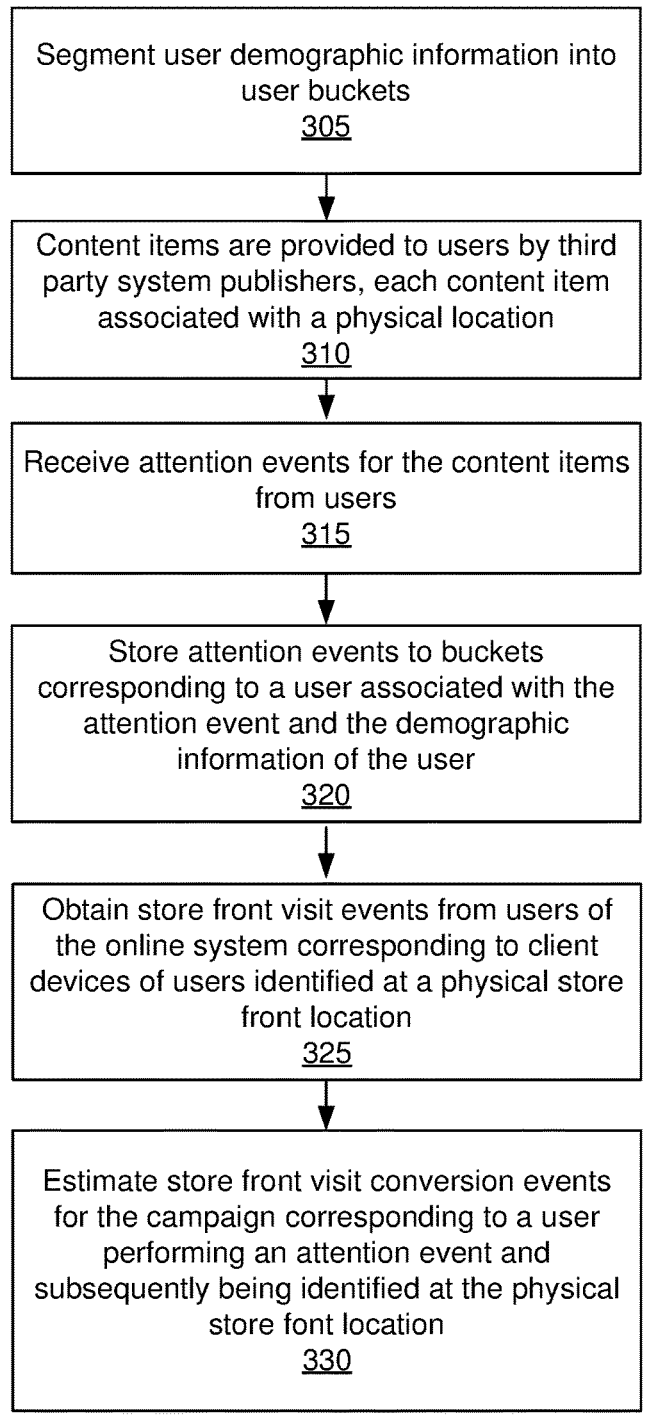
FIG. 3 is a flowchart of a method for promoting physical store visits by presenting users with content items for a physical store location and logging visits of online system users to the physical store location to track performance of a campaign, in accordance with an embodiment of the invention.

A Method for Optimizing Advertisement Campaigns to Promote Physical Store Visits FIG. 3 is a flowchart of one embodiment of a method for estimating attribution for advertisement campaigns that promote physical store visits as conversions. In other embodiments, the method may include different and/or additional steps than those shown in FIG. 3. Additionally, steps of the method may be performed in different orders than the order described in conjunction with FIG. 3.

The online system 140 segments 305 demographic information of users of the online system 140 into a plurality of user buckets. Each user bucket includes a different range of values for one or more user demographics relative to other user buckets of the plurality of user buckets. For example, in one embodiment, each user bucket corresponds to a highest cardinality combination of available user information that can be stored or logged for a user based on privacy concern issues related to location tracking.

Accordingly, content items associated with an advertising campaign are provided 310 for display to users of the online system 140. The content items, in one embodiment, are provided 310 by third party systems 130 or publishers. In another embodiment, the online system 140 could provide 310 the content items to the users. Each content item in the campaign, in one embodiment, is associated with a physical store front location (e.g., a store, such as a grocery store, a restaurant, a spa, a clothing store, etc.) and describes a product or service available for purchase at the physical store front location. In one embodiment, the content items are provided 310 to users based on their proximity to the physical store front location, such as being within a predetermined (or threshold) distance of the physical store front location as determined by a location determination device or process (e.g., GPS, Bluetooth beacon signal, WiFi signal, etc.).

The online system receives 315 attention events for the content items from a content item viewing set of users. In one embodiment, the attention events are received 315 by the online system via signals from tracking pixels, as described above. The signals correspond to content items for a campaign being displayed to a viewing set of users of the online system on one or more third party webpages that include a tracking pixel. An attention event, in one embodiment, corresponds to a user of the viewing set of users demonstrating an interest in a content item. As described above, each attention event corresponds to a user viewing the presented content item demonstrating some interest in the presented content item. Interest in the content item can be demonstrated by a user's gaze lingering on the content item for more than a threshold period of time, the user selecting the content item to receive more information or obtaining directions to a store front via the content item, and so forth, among other actions performable by a user. However, when facilitating store front visit attribution for third party systems or publishers, the online system 140 may not be able receive the level of demonstrated interest from users that the online system 140 receives when presenting the content items themselves. Thus, in these instances, the online system 140 may count a content item merely being displayed to a user in an impression opportunity as an attention event. Alternatively, the online system 140 may require a higher threshold of qualification and require a user to click on or select the content item to qualify for an impression opportunity.

The online system stores 320 each attention event to a user bucket for the user associated with the attention event based on the user's demographic information. The online system 140 registers the attention event as a store front visit conversion event if, within a predetermined period of time from the attention event, the user subsequently goes in and physically visits the physical store front location, as determined using location information from a mobile device of the user. Thus, the attention event is only valid for a predetermined time period and invalid upon expiration of the predetermined time period. The predetermined period of time can vary based on the type of attention event. For example, a user selecting a content item describing a product is confirmation of a user's interest in the product that could warrant a longer time period (e.g., 28 day or 1 month) for qualifying as a valid store front visit conversion. In another example, an attention event resulting from a determination of the user's gaze lingering on the content item for more than the threshold period of time could warrant a shorter period of time (e.g., 7 days) since the gaze could be coincidental or the user could have been daydreaming. Alternatively, the predetermined time period of registering a store front conversion event could be fixed regardless of the type of attention event.

Similarly, the online system obtains 325 store front visit events from a visiting set of users of the online system. Each store front visit event corresponds to a client device of a user of the visiting set of users being identified at the physical store front location associated with the content item. Each store front visit event is stored with a timestamp corresponding to when the store front visit event occurred. In order to maintain the privacy of users, the online system similarly store anonymizes store front visit events by generalizing user information of the user vising the store front to the user's demographic information associated with a user bucket. Accordingly, each new attention event or store front visit for a user bucket incrementally increases a count in the user bucket for the new attention event or store front visit. In one embodiment, the timestamp of each store visit is stored at a reduced resolution (e.g. rounded to the hour) to further ensure the anonymity of the user.

In one embodiment, the client device that a user uses when causing the online system to register an attention event does not need to be the same client device that the user eventually walks into a store front location with to trigger a store front visit event. For example, a user could view or click on a content item on their work desktop while logged into their user account with the online system 140 and then later visit the store front location with their smartphone that has an application associated with their user account with the online system 140 installed thereon.

The online system 140 determines 330 a number of store front visit conversion events for the campaign. Here, each store front visit conversion event corresponding to a user of the viewing set of users registering an attention event and subsequently being identified at the physical store front location associated with the campaign within the predetermined period of time. This process is further described with respect to FIG. 4, which is a diagram of a method for tracking attention events and subsequently determining store visit conversion events within a predetermined period of time from each attention event corresponding to a store front visit conversion event, in accordance with an embodiment of the invention.

Figure 4:
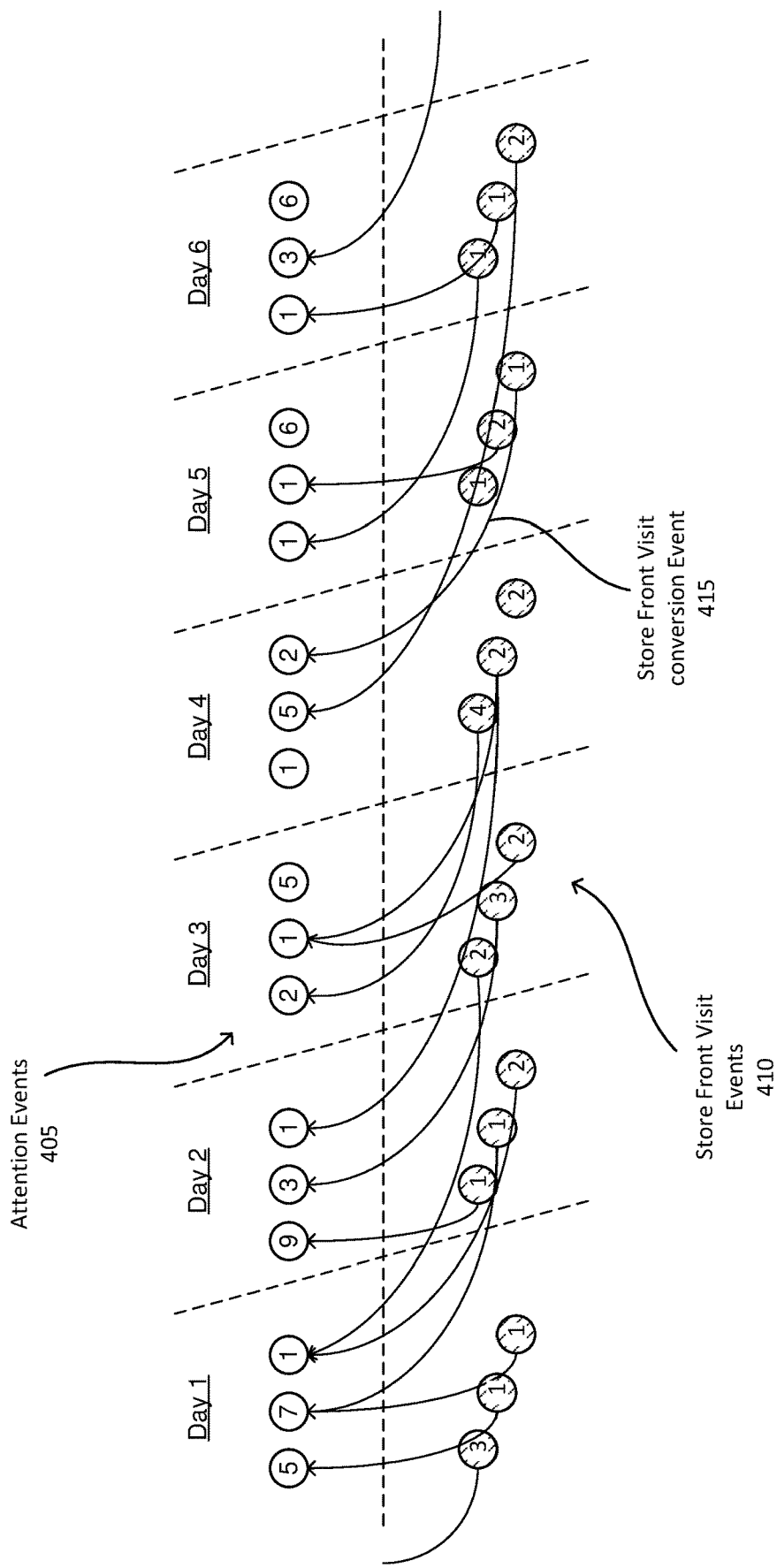
FIG. 4 is a diagram of a method for tracking attention events and subsequently determining store visit conversion events within a predetermined period of time from each attention event corresponding to a store front visit conversion event, in accordance with an embodiment of the invention.

FIG. 4 shows a 6 day window where users are performing (and the online system 140 is logging) attention events 405 and store front visit events 410. Accordingly, in this example, the arrows between the store front visit events and attention events correspond to store front visit conversion events 415. In this example, referring to Day 4 and Day 5, there were 8 attention events (1+5+2) on Day 4 and 4 store front visits (1+2+1) on Day 5 and a store front visit conversion event 415 between a store front visit on Day 5 and an attention event on Day 4. This store front visit conversion events 415 corresponds to a user identified as belonging to a user bucket $B_i$ performed an attention event on Day 4 and another user also identified as belonging to a user bucket $B_i$ (that could be the same user in actuality) performed a store front visit on Day 5. Since the store visit on Day 5 is within the predetermined time period for the attention event performed on Day 4, the online system 140 registers these two events together as a store front visit conversion event 415. The result of anonymizing the store front visit events and attention events is that the content item impression corresponding to a store front visit event is not explicitly knowable and users are bucketed into the user buckets to intentionally prevent this from being knowable. Thus, in order to determine 330 the number of store front visit conversion events, the online system 140 determines 330 the number of store front visit conversion events for the campaign by matching store front visits to attention events that have yet to expire for each user bucket. As such, the determined 330 number of store visit conversion events is an estimate rather than a precise or exact number of users who are associated with a store visit conversion event. This estimate, however, provides insight into the type of user who is more likely to respond to this type of advertising campaign.

Accordingly, in one embodiment, the online system 140 uses store visit data from the store visit conversion events to build a model that optimizes for store visits as a conversion. For example, the online system 140 identifies user buckets associated with the most frequent number store front visit conversions to identify user segments that are more likely to be responsive to the campaign and the online system can train a model to identify users that are most likely to visit a store front after viewing a content item describing a product or service available for purchase at the store front location. Alternatively, the online system can adjust targeting criteria for the campaign to provide content items to users falling within the identified user buckets.

In one embodiment, the one or more user demographics includes a user-location propensity score corresponding to a propensity of the user to visit the physical store front location. In order to determine the user-location propensity score, the online system 140 obtains location history of the user that identifies one or more locations and a visit frequency associated with each of the one or more locations. The user-location propensity score is then determined by comparing the physical store front location to the one or more locations, determining a similarity score between each of the one or more locations to the physical store front location weighted for the visit frequency associated with each location, and aggregating the similarity scores to determine the user-location propensity score. In one embodiment, the location history is an explicit "opt-in" from the user, and only a small fraction of the users have opted in to allow the online system 140 to store their location history. As a result, the user-location propensity score does not require location history of a particular user, but is rather computed based on a similarity of a particular user (whether or not they are opt-in to location history) to those people who have opted-in. For example, the online system 140 may not know a particular user's location history, but based on this user having similar online behavior to a particular group of users that have shared their location history with the online system 140, the online system 140 can determine their offline behavior to similar to this group of users. Accordingly, a group of user similar to the user (e.g., based on similar online behavior, browsing history, user demographics, and so forth) who have opted-in to sharing location history is identified. The location history of the group of similar users, in one embodiment, identifies one or more locations and a visit frequency associated with each of the one or more locations. The location propensity score for the user is then determined by comparing the physical store front location to the one or more locations from the obtained user history and determining a similarity score between each of the one or more locations to the physical store front location weighted for the visit frequency associated with each location. Finally, the similarity scores are aggregated to determine the location propensity score. Various other methods can be used to determine a user's propensity to visit a particular location and various other types of data can be used to further segment the users into more meaningful user buckets while also maintaining user privacy.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining, by an online system, a user profile for each of a plurality of users of the online system, a user profile for a user including demographic information for the user;
   segmenting the demographic information into a plurality of user buckets, each of the plurality of user buckets associated with a different range of values for one or more user demographics;
   receiving, by the online system, attention events from tracking pixels included in one or more third party webpages that display content items for a campaign to a viewing set of users of the online system on the one or more third party webpages, the attention events indicating identities of one or more users that indicated interest in the content items included in the one or more third party web pages, wherein the content items are associated with one or more physical store front locations and describe a product or service available for purchase at the one or more physical store front locations;
   assigning, by the online system, each attention event from the attention events to a corresponding one of the plurality of user buckets based on demographics of a user associated with the attention event, each attention event being valid for the predetermined time period from when the attention event was received and invalid upon expiration of the predetermined time period, wherein each assigned attention event is anonymized such that the attention event is not explicitly associated with any of the user profiles maintained by the online system;

obtaining store front visit events of a visiting set of users of the online system from client devices corresponding to users of the visiting set of users, each store front visit event corresponding to a client device of a user of the visiting set of users being identified at the one or more physical store front locations associated with the content items for the campaign; and for each of the obtained store front visit events:
assigning, by the online system, the store front visit event to a user bucket from the plurality of user buckets, the user bucket associated with a range of values of demographics that matches demographics of the user associated with the store front visit event, wherein the assigned store front visit event is anonymized such that the store front visit event is not explicitly associated with any of the user profiles maintained by the online system;

determining that the assigned store front visit event occurred within the predetermined time period of at least one attention event assigned to the user bucket that includes the assigned store front visit event; and responsive to the determination, attributing the store front visit event to the campaign.

2. The method of claim 1, wherein attention events corresponding to the content items for the campaign are received via tracking pixels associated with at least one of the one or more third party webpages or the content items.

3. The method of claim 2, wherein the attention events are triggered by the content items being displayed to the viewing set of users, by the content items being selected by the viewing set of users, or a combination thereof.

4. The method of claim 1, wherein the one or more user demographics include at least one of age of the user, gender of the user, a city associated with the user.

5. The method of claim 4, wherein the different range of values for the one or more user demographics corresponds an age range associated with each user bucket, and wherein each user bucket is associated with a different combination of the age range and gender.

6. A method comprising:
receiving, by an online system, an attention event corresponding to a content item being displayed on a first client device of a viewing user of the online system, the content item being associated with one or more physical store front locations and describing a product or service available for purchase at the one or more physical store front locations, the attention event including user identifying information;

identifying, by the online system, a user profile for the viewing user using the identifying information from the attention event;

storing the attention event at the online system for a predetermined time period, the attention event being stored to a user bucket of a plurality of user buckets for the viewing user based on demographic information of the viewing user maintained by the online system in the user profile of the viewing user, the user bucket associated with a range of values that matches demographic information included in the viewing user's identified user profile and wherein the attention event is valid for the predetermined time period from when the attention event was received and invalid upon expiration of the predetermined time period, wherein the stored attention event is anonymized such that the stored attention event is not explicitly associated with the identified user profile of the viewing user;

obtaining a store front visit event corresponding to a second client device of the viewing user being identified at one of the one or more physical store front locations associated with the content item, the second client device different than the first client device;

storing, by the online system, the store front visit event to the user bucket from the plurality of user buckets, wherein the stored store front visit event is anonymized such that the stored store front visit event is not explicitly associated with the identified user profile of the viewing user;

responsive to determining that the stored store front visit occurred prior to expiration of the predetermined time period of the attention event that is also stored in the user bucket that includes the stored store front visit, attributing the stored store front visit event of the viewing user to the content item corresponding to the attention event.

7. The method of claim 6, wherein the content item is displayed on a third party webpage.

8. The method of claim 7, wherein the attention event corresponding to the content item being displayed on the first client device of the viewing user is received via a tracking pixel associated with at least one of the one or more third party webpages or the content items.

9. The method of claim 6, wherein the attention event is triggered by the content item being displayed to the viewing user.

10. The method of claim 6, wherein the attention event is triggered by the content item being selected by the viewing user.

11. A computer program product comprising a non-transitory computer-readable storage medium containing computer program code for:
maintaining, by an online system, a user profile for each of a plurality of users of the online system, each user profile including demographic information for the user associated with the user profile;

segmenting the demographic information into a plurality of user buckets, each of the plurality of user buckets associated with a different range of values for one or more user demographics;

receiving, by the online system, attention events from tracking pixels included in one or more third party webpages that display content items for a campaign to a viewing set of users of the online system on the one or more third party webpages, the attention events indicating identities of one or more users that indicated interest in the content items included in the one or more third party web pages, wherein the content items are associated with one or more physical store front locations and describing a product or service available for purchase at the one or more physical store front locations;

assigning, by the online system, each attention event from the attention events to a corresponding one of the plurality of user buckets based on demographics of a user associated with the attention event, each attention event being valid for the predetermined time period from when the attention event was received and invalid upon expiration of the predetermined time period, wherein each assigned attention event is anonymized such that the attention event is not explicitly associated with any of the user profiles maintained by the online system;

obtaining store front visit events from store front visiting users of the online system from client devices corresponding to users of the store front visiting set of users, each store front visit event corresponding to a client device of a store front visiting user being identified at the one or more physical store front locations associated with the content items for the campaign; and for each of the obtained store front visit event, assigning, by the online system, the store front visit event to a user bucket from the plurality of user buckets, the user bucket associated with a range of values of demographics that matches demographics of the user associated with the store front visit event, wherein the assigned store front visit event is anonymized such that the store front visit event is not explicitly associated with any of the user profiles maintained by the online system;

determining that the assigned store front visit event occurred within the predetermined time period of at least one attention event assigned to the user bucket that includes the assigned store front visit event; and responsive to the determination, attributing the store front visit event to the campaign.

12. The computer program product of claim 11, wherein attention events corresponding to the content items for the campaign are received via tracking pixels associated with at least one of the one or more third party webpages or the content items.

13. The computer program product of claim 12, wherein the attention events are triggered by the content items being displayed to the viewing set of users, by the content items being selected by the viewing set of users, or a combination thereof.

14. The computer program product of claim 11, further containing computer program code for:

identifying user buckets associated with a number store front visit conversion events greater than a threshold number; and adjusting targeting criteria for the campaign to provide content items to users associated with the identified user buckets.

15. The computer program product of claim 11, wherein the one or more user demographics include at least one of age of the user, gender of the user, a city associated with the user.

16. The computer program product of claim 15, wherein the different range of values for the one or more user demographics corresponds an age range associated with each user bucket, and wherein each user bucket is associated with a different combination of the age range and gender.

17. The computer program product of claim 15, wherein the one or more user demographics include a user location propensity score corresponding to a propensity of the user to visit the physical store front location, wherein determining the user location propensity score for a user includes:

identifying, based on online behavior of the user, a group of similar users who have opted-in to sharing location history, the location history of the group of similar users identifying one or more locations and a visit frequency associated with each of the one or more locations; and determining the location propensity score for the user by:

comparing the physical store front location to the one or more locations from the obtained user history;

determining a similarity score between each of the one or more locations to the physical store front location weighted for the visit frequency associated with each location; and aggregating the similarity scores to determine the location propensity score.

* * * * *